United States Patent [19]
Appleton

[11] 3,815,855
[45] June 11, 1974

[54] INTEGRAL CLAMP AND CLAMP-BACK FOR ELECTRICAL CONDUIT

[76] Inventor: Arthur I. Appleton, 1 Bridlewood Rd., Northbrook, Ill. 60062

[22] Filed: Aug. 10, 1972

[21] Appl. No.: 279,341

[52] U.S. Cl............ 248/74 B, 24/73 SA, 24/243 H, 24/259 C, 174/40 CC
[51] Int. Cl............................................. F16l 3/12
[58] Field of Search.... 248/74 B, 69, 62, 54, 74 PB, 248/71, 231; 24/279, 73 SA, 20 LS, 243 AC, 243 H; 174/40 CC

[56] References Cited
UNITED STATES PATENTS

| | | | |
|---|---|---|---|
| 1,284,325 | 11/1918 | Hart | 24/279 |
| 1,882,305 | 10/1932 | Stupar et al. | 24/279 |
| 2,090,374 | 8/1937 | Olson | 24/279 |
| 2,432,491 | 12/1947 | Tinnerman | 248/74 B X |
| 2,440,469 | 4/1948 | Goddard | 248/68 R |
| 2,998,217 | 8/1961 | Englis et al. | 248/74 B |
| 3,376,004 | 4/1968 | Goldman | 248/74 B |
| 3,505,761 | 4/1970 | Prieur | 248/74 PB |

FOREIGN PATENTS OR APPLICATIONS

| 1,167,200 | 11/1958 | France | 248/74 B |
|---|---|---|---|

Primary Examiner—Roy D. Frazier
Assistant Examiner—Rodney H. Bonck
Attorney, Agent, or Firm—Darbo, Robertson & Vandenburgh

[57] ABSTRACT

The integral clamp and clamp-back are stamped from a single piece of sheet metal. Two space support runners extend in one direction from a base. From one end of the base a hand extends outwardly from between the runners. At the distal end of the band is a clamp plate. The clamp plate is positioned above the other end of the base and each has an opening therethrough which a mounting fastener can extend. The length of the band is somewhat smaller than the external circumference of the conduit it is to hold.

3 Claims, 5 Drawing Figures

PATENTED JUN 11 1974　　　　　　　　　　　　　　　　3,815,855
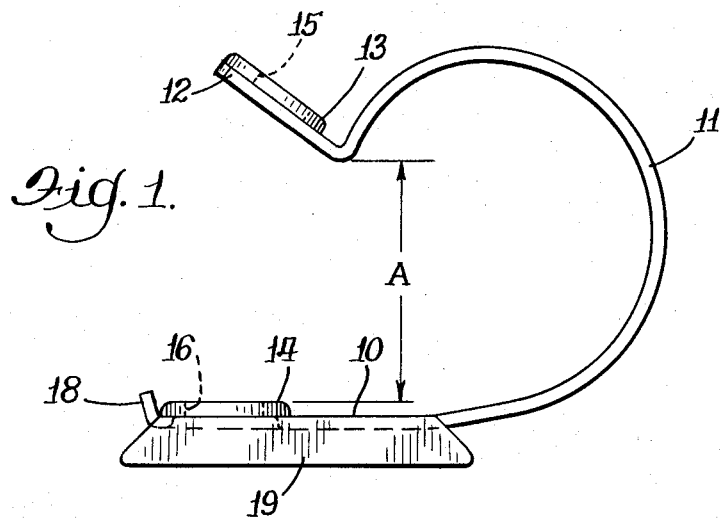
Fig. 1.
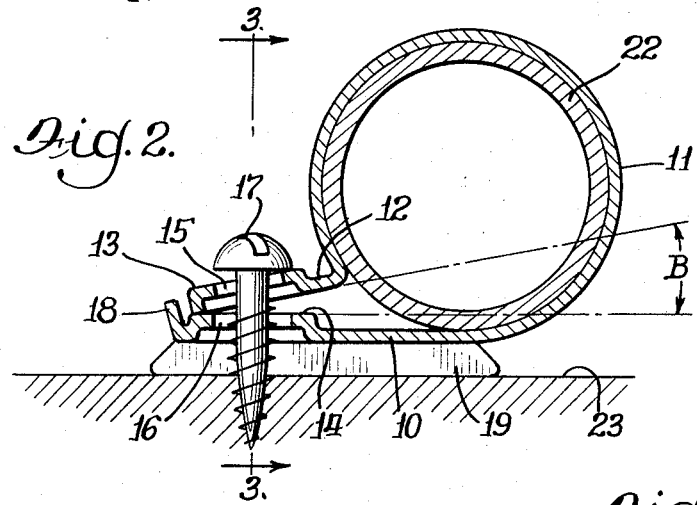
Fig. 2.
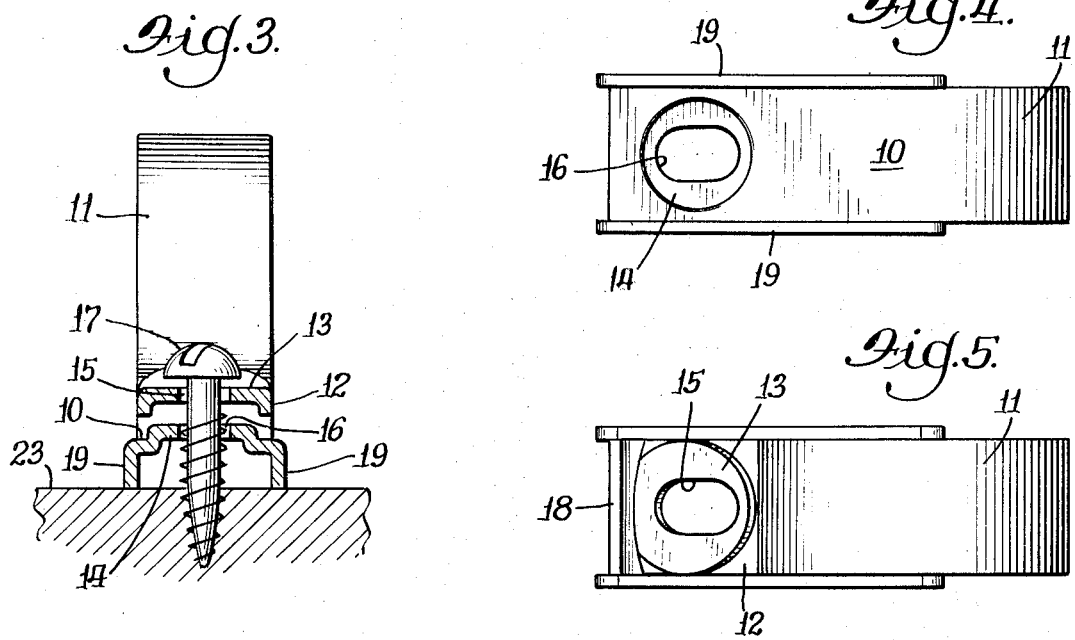
Fig. 3.　　　　　　Fig. 4.
Fig. 5.

INTEGRAL CLAMP AND CLAMP-BACK FOR ELECTRICAL CONDUIT

SUMMARY OF THE INVENTION

The present invention relates to a simplified and inexpensive mounting for electrical conduit, which mounting comprises an integral clamp and clamp-back.

DESCRIPTION OF THE DRAWINGS

FIG. 1 is an elevational view of an embodiment of the invention;

FIG. 2 is an elevational view showing this embodiment being used to hold a conduit on a wall;

FIG. 3 is a section as seen at line 3—3 of FIG. 2;

FIG. 4 is a bottom view of the embodiment; and

FIG. 5 is a top view as seen somewhat to the left of vertically above the embodiment as viewed in FIG. 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The illustrated embodiment includes a base 10 having a curvilinear band 11 extending from one end thereof. At the distal end of the band is a clamping plate 12. In the relaxed state, as illustrated in FIG. 1, the clamping plate 12 lies in a plane which is at approximately right angles to a tangent to the curve at the distal end of the band. The clamping plate and the other end of the base 10 have dished portions 13 and 14 respectively defined by a central flat area and a downwardly extending rim. These dished portions have oval openings 15 and 16 (elongated in the direction of the length of the base) to receive a fastener such as screw 17. At said other end of the base 10 is an upwardly projecting flange 18. Extending downwardly from the base 10, at substantially right angles thereto, are a pair of supports in the form of runners 19.

The device is used to hold a conduit 22 in relationship to a surface 23, such as a ceiling, a wall or the like. As supplied, the device is in the general configuration illustrated in FIG. 1. Here, the band 11, while curved, is not curved to the extent necessary to snugly fit the conduit. The dimension A in FIG. 1 is in the general range of the external diameter of the conduit, usually being slightly smaller than the diameter. This enables the band to be easily slipped over the conduit, yet it will not immediately fall off if it is not held in place. The clamping plate 13 is then drawn down toward the base 10, the fastener inserted through the openings 15 and 16 and the fastener is screwed into the wall or other support. As this is done, the pull on the screw tensions the band about the outside of conduit 22. When finally snug about the conduit, the angle of the clamping plate to the base, the angle B in FIG. 2, is in the range of about 10°. To achieve this, the length of the band as measured about the inside thereof should be in the range of about seven-eighths of the length of the external circumference of the conduit.

The dished portions 13 and 14 of the plate and base strengthen these parts against being deformed as the band is drawn tightly about the conduit. Furthermore, the runners 19 and the flange 18 also serve to support the base against bending. All of the parts of the integral base and clamp are formed from a single piece of sheet metal. The sheet metal is stamped to cut the parts from the sheet of metal and to bend the various parts with respect to each other in the manner illustrated and described. This provides a simple and inexpensive construction. Furthermore, the resulting configuration simplifies the inventory problems both for the distributor and for the user. They need not maintain stocks of two types of parts which is required following the prior art practices of a separate clamp and clamp base.

I claim:

1. A mounting device for use in conjunction with a fastener in supporting an electrical conduit of substantially a given external diameter from a wall or the like, said device comprising:

a planar base having an opening therethrough adjacent one end thereof to receive said fastener, said base having another end; a spaced pair of runners extending in the same general direction from the base and at substantially right angles thereto; a band extending from between the runners at the other end of said base, the internal length of said band being somewhat smaller than the external circumference of said conduit; and a clamping plate extending outwardly from the distal end of said band, said plate having an opening therethrough to receive said fastener; said base runners, band and plate all being formed integrally from a single piece of sheet metal; said band being curved so that the plate overlies said base at the side thereof opposite said runners with said opening in said plate being spaced from said opening in said base a distance in the general range of the dimension of said diameter; the portions of said plate and said base surrounding said openings being dished, said base at said one end thereof having a flange angularly positioned with respect to the plane of the base, said plate being substantially normal to a tangent to the curve at the distal end of the curved band.

2. A device as set forth in claim 1, wherein the length of the interior of said band is approximately seven-eighths the length of said circumference.

3. A device as set forth in claim 1, wherein said dished portions each comprise a flat area about the respective opening which flat area terminates in a downwardly extending rim, said openings being elongated in a direction parallel to said runners.

* * * * *